(12) United States Patent
Kaburlasos et al.

(10) Patent No.: US 12,253,901 B2
(45) Date of Patent: Mar. 18, 2025

(54) SYSTEMS AND METHODS FOR STABLE AND ELEVATED IDLE-MODE TEMPERATURE FOR ASSEMBLED SEMICONDUCTOR DEVICES

(71) Applicant: Intel Corporation, Santa Clara, CA (US)

(72) Inventors: Nikos Kaburlasos, Folsom, CA (US); Rodrigo De Oliveira Vivi, Lithia, FL (US); Phani Kumar Kandula, Murugeshpalya (IN); Marc Beuchat, Folsom, CA (US); Mark J. Luckeroth, Portland, OR (US); Eric J. M. Moret, Beaverton, OR (US); David N. Lombard, Rossmoor, CA (US); John Kelbert, Aptos, CA (US); Brad Bittel, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 17/490,290

(22) Filed: Sep. 30, 2021

(65) Prior Publication Data
US 2023/0101997 A1  Mar. 30, 2023

(51) Int. Cl.
*G06F 1/32* (2019.01)
*G06F 1/08* (2006.01)
(Continued)

(52) U.S. Cl.
CPC .............. *G06F 1/3296* (2013.01); *G06F 1/08* (2013.01); *G06F 1/3228* (2013.01)

(58) Field of Classification Search
CPC ......... G06F 1/3296; G06F 1/08; G06F 1/3228
See application file for complete search history.

(56) References Cited

U.S. PATENT DOCUMENTS 5,752,011 A    5/1998 Thomas
2012/0166839 A1    6/2012 Sodhi et al.
(Continued)

OTHER PUBLICATIONS

"International Application Serial No. PCT US2022 037450, International Search Report mailed Nov. 7, 2022", 3 pgs.
(Continued)

*Primary Examiner* — Stefan Stoynov
(74) *Attorney, Agent, or Firm* — Nicholson De Vos Webster & Elliott, LLP

(57) ABSTRACT

Disclosed herein are embodiments of systems and methods for stable and elevated idle-mode temperature for assembled semiconductor devices. In an embodiment, a processor includes a communication interface configured to receive, from a first hardware component, instructions assigned to the processor for execution. The processor also includes temperature-measurement circuitry configured to monitor an on-chip temperature of the processor. The processor also includes control logic configured to: determine whether the processor is active or idle; determine whether the on-chip temperature of the processor exceeds a first threshold; based on determining that the processor is idle and that the on-chip temperature of the processor exceeds the first threshold, disable one or more idle-mode power-saving features of the processor; and selectively adjust one or more operating parameters of the processor to keep the on-chip temperature of the processor between the first threshold and a second (higher) threshold.

20 Claims, 8 Drawing Sheets

(51) Int. Cl.
    *G06F 1/3228*     (2019.01)
    *G06F 1/3296*     (2019.01)

(56) References Cited

U.S. PATENT DOCUMENTS

| | | |
|---|---|---|
| 2014/0122917 A1 | 5/2014 | Chung et al. |
| 2017/0060220 A1* | 3/2017 | Grossmann ............. G06F 1/206 |
| 2020/0319700 A1 | 10/2020 | Wu et al. |
| 2020/0348887 A1* | 11/2020 | Kim ..................... G06F 3/0619 |
| 2021/0223805 A1 | 7/2021 | De Oliveira Vivi et al. |
| 2022/0413573 A1* | 12/2022 | Chiu ........................ G06F 1/20 |

OTHER PUBLICATIONS

"International Application Serial No. PCT US2022 037450, Written Opinion mailed Nov. 7, 2022", 4 pgs.
International Preliminary Report on Patentability, PCT App. No. PCT/US2022/037450, Apr. 11, 2024, 06 pages.
International Search Report and Written Opinion, PCT App. No. PCT/US22/37450, Nov. 7, 2022, 7 pages.

* cited by examiner

SYSTEMS AND METHODS FOR STABLE AND ELEVATED IDLE-MODE TEMPERATURE FOR ASSEMBLED SEMICONDUCTOR DEVICES

This invention was made with Government support under Agreement No. 8F-30005, awarded by DOE. The Government has certain rights in this invention.

TECHNICAL FIELD

Embodiments of the present disclosure relate to semiconductor devices, processors, graphic processing units (GPUs), accelerators, power dissipation, and, more particularly, to systems and methods for stable and elevated idle-mode temperature for assembled semiconductor devices.

BACKGROUND

Numerous types of processors are in use in an uncountable number of computing devices throughout the world. These computing devices include laptop computers, servers, smartphones, tablets, printers, cars, high performance computing (HPC) applications such as those in data centers and those involving supercomputers, and so on. Moreover, the types of processors being used in these various types of computing devices include central processing units (CPUs), accelerators—including, e.g., GPUs, field programmable gate arrays (FPGAs), other types of microprocessors, and many other types of processors. Typically, a processor, for example a GPU, is referred to at different times as being either "active" or "idle." These states are also referred to using phrasing such as "in active mode," "in idle mode," and the like. Generally speaking, a GPU is active when it is processing instructions for an actual task for which that processing is needed. Such instructions are often collectively referred to as "user workload (UWL)," and by other terms. Carrying out tasks such as executing UWL causes an increase in the operating temperature of the GPU, and a corresponding increase in the amount of heat being dissipated by the GPU.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
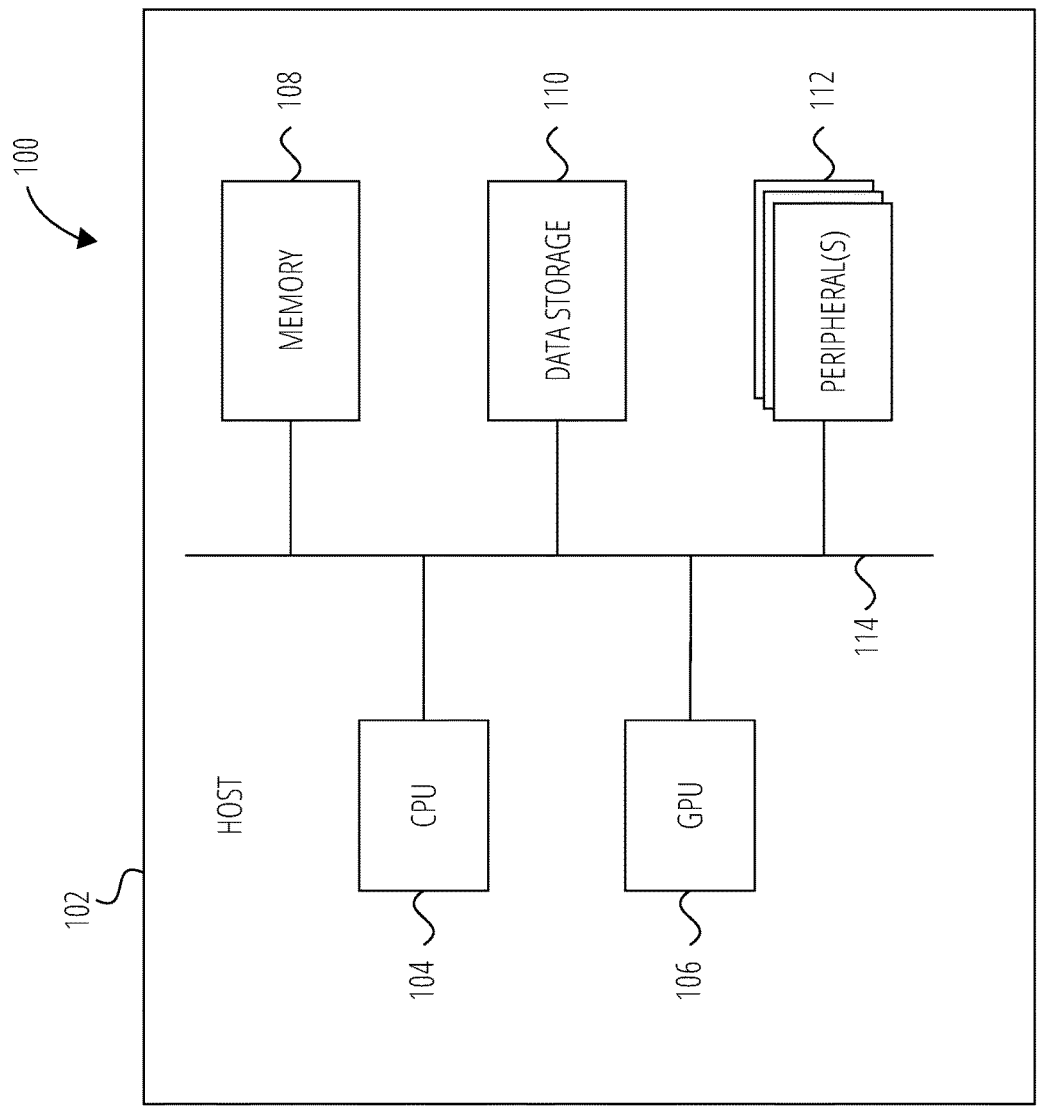
FIG. 1 depicts an example architecture of an example host that includes an example CPU and an example GPU, in accordance with at least one embodiment.

In HPC applications and in other contexts, some assembled semiconductor devices are subject to often-occurring transitions between active periods and idle periods. To illustrate, consider a current example implementation of a GPU that, in operation, is designed to only ever be either (i) processing instructions (i.e., UWL) that are sent to it by, e.g., a CPU (during what are, by definition, "active periods" for the GPU) or (ii) not processing any instructions (during what are, by definition, "idle periods" for the GPU). During idle periods, the GPU is essentially just waiting around for more UWL to arrive.

Other examples of current GPU implementations have been designed, engineered, and manufactured to implement one or more of what are referred to herein as "idle-mode power-saving features." The primary purpose of idle-mode power-saving features is, as their name suggests, to reduce power consumption (and consequent power dissipation) while the processor is in idle mode (i.e., during idle periods). Some example idle-mode power-saving features are:
- dynamic power gating of idle logic blocks on a GPU;
- dynamic clock gating of sequential elements (e.g., flops or latches) on a GPU when these elements do not sample new data;
- dynamic clock gating of logic units on a GPU when the logic units are not being used; and
- dynamic gating of entire clock trees when the logic under such clock trees is idle.

Other examples of idle-mode power-saving features could be listed here as well and will be known to those of skill in the art. Moreover, many of the embodiments that are described in the present disclosure are described in connection with a GPU, this is by way of example and not limitation. Embodiments of the present disclosure are also applicable to other types of processors, microchips, assembled semiconductor devices, and the like.

As described, during active periods, a conventional GPU is, by definition, processing UWL—and accordingly dissipating a relatively high amount of power for that GPU. During idle periods, however, not only is a conventional GPU dissipating less power as a result of not processing any UWL, but a conventional GPU that has one or more idle-mode power-saving features is typically also making use of one or more of those features. The use of idle-mode-power-saving features of course further reduces the amount of power dissipation by the GPU during idle periods.

Thus, due to processing UWL during active periods and not processing any UWL during idle periods, and exacerbated by the use of idle-mode power-saving features in many instances, it is often the case in conventional implementations that the on-chip temperature of the GPU (and therefore also the current level of power dissipation of the GPU) fluctuates wildly across numerous active periods and idle periods. These fluctuations are significant in both their magnitude and in how often they happen. The latter of those two aspects (i.e., how often the fluctuations happen) could also be described as the "frequency" of the fluctuations, though care should be taken to distinguish between that somewhat "everyday" usage of the word "frequency" (e.g., "the frequency of thunderstorms in a given city") and the more-technical usage of the word "frequency" in the context of semiconductor devices such as GPUs.

That more-technical usage relates to operating parameters of the, e.g., GPU such as the clock frequency (i.e., the physical frequency of the clock signal), where such frequencies are highly regular and on the order of megahertz (MHz), gigahertz (GHz), and the like. This is the type of "frequency" that is typically listed among the technical specs of a given processor, integrated circuit (IC), and the like. In many cases, this frequency is listed as the "speed" of the processor. And though it is highly regular, the clock frequency in many implementations can be varied during operation, as is more fully discussed below. In any event, in an effort to keep these two senses of the word "frequency" coherently separate in the balance of this disclosure, the word "fluctuate" (and its various forms) is generally used to describe the irregular and unpredictable alternations, transitions, "ping-ponging," and the like between active periods/mode and idle periods/mode, whereas the word "frequency" is generally used herein to refer to a physical operating parameter such as the frequency of the clock signal (a.k.a. "the clock frequency," "the clock-tree frequency," and the like).

Typically, in the manufacturing of a GPU (or other processor), a silicon chip is mounted to a top side of a substrate. The chip and the substrate are, at that point, components of what is often referred to as a "chip package" or just a "package." In a given GPU (as an example type of processor), the often-occurring and pronounced fluctuations in on-chip temperature that occur across numerous active periods and idle periods often result in thermal stresses at one or more of what are referred to as "package interfaces" of the GPU. These stresses can lead to substantial joint fatigue and failures, which can result in degradation of system reliability. One example type of package interface at which this problem can manifest are die-substrate interfaces, which are also referred to as "first-level interconnects." Another example are package/printed-circuit-board (PCB) interfaces, which are also referred to as "second-level interconnects." A third example are within-package die-die interfaces in the context of implementations that are often referred to as "die stacks."

In some instances, by way of example, the thermomechanical reliability problem that is described above can manifest at package/PCB interfaces in implementations that use what is known as a ball grid array (BGA) of solder balls. This type of implementation may also be referred to as a "BGA package," and is often used to mount chip packages to PCBs. In many instances, a plurality of solder balls (e.g., as part of a BGA) that are affixed on the bottom side of the substrate serve as contacts to make electrical connections between the chip package and the PCB when the chip package is mounted on the PCB. Indeed, this thermal-stressing problem is exacerbated on larger and higher-power packages, notably for soldered BGA packages, as well as in the context of large systems. In some of the more extreme cases, the degraded level of reliability resulting from repeated thermal stresses over time can threaten the operational viability of a given system. In some instances, this reliability risk can be mitigated at least in part by choice of materials, as well as by the use and strategic placement of non-critical-to-function (nCTF) solder balls in the aforementioned arrays.

As described herein and as known to those of skill in the art, power is typically dissipated by GPUs and other processors in the form of heat. As such, the on-chip temperature of a given GPU at a given time tends to be substantially proportional to the amount of power being dissipated by the GPU at that time. And even if not purely directly proportional, the on-chip temperature of the given GPU and the current amount of power being dissipated by the GPU are typically highly positively correlated with one another. In other words: dissipate more power, produce more heat; dissipate less power, produce less heat.

It is noted here that the on-chip temperature is typically not directly measured. Rather, one or more temperature readings are typically made at one or more locations such as junction points, and those one or more temperature readings can then be used to calculate an estimate of (i.e., infer) the on-chip temperature. In embodiments of the present disclosure, although it is indirectly measured (i.e., calculated, estimated, inferred, and/or the like from other measurements), it is that on-chip temperature that is used as one of the controlling parameters to guide decision logic in implementing a stable and elevated idle-mode temperature for a GPU (or other processor), as is more fully described below.

Various approaches have been tried with respect to addressing the problem of fluctuating on-chip temperatures that can cause thermal stressing and eventual reductions in reliability. As one example, an adhesive (e.g., glue) has been applied at the corners of the package/PCB interface of BGA packages. This, however, can significantly limit the reworkability of those packages. Among other problems, this increases replacement cost, especially on cards that hold more than one such package—even if the neighboring packages are still otherwise viable, they typically must be discarded along with the rest of the card.

In addition to the adhesive approach, approaches have been proposed that employ 'dummy' kernels, which collectively are often referred to as "idle workload (IWL)." When utilized, the execution of IWL is launched on the GPU during idle periods, in order to generate a sufficient amount of heat on the die to prevent the temperature at package interfaces to the PCB (e.g., solder balls) from dropping too much. This is a way to avoid temperature fluctuations and the consequent thermal stresses on the package. One drawback to the IWL approach is that, unlike embodiments of the present disclosure, the IWL approach requires software involvement, which adds a layer of complexity that is avoided by the hardware-only approach of at least some embodiments of the present disclosure.

Generally speaking, even in combination, previous approaches have not proven sufficient to adequately ameliorate the degradation in reliability that often results from the thermal stressing that is caused by on-chip-temperature fluctuations. Indeed, as but one example, it is anticipated that, in the context of large-scale systems that include thousands of soldered packages, this thermal stressing could well reduce average package lifetime to a third or less of what would otherwise be expected.

As mentioned, in contrast to some previous attempts to address the thermal-stressing problem, at least some embodiments of the present disclosure do not involve utilize a software component. This makes embodiments of the present disclosure easier to implement by avoiding the complexities, coding errors, and so forth that often accompany solutions that involve hardware. Indeed, in many embodiments of the present disclosure, the implemented logic functions to selectively disable idle-mode power-saving features already supported on some currently implemented GPUs.

Indeed, embodiments of the present disclosure result in increased reliability of accelerators (e.g., GPUs), other processors, and the like. This naturally also makes the systems in which these components are installed and operating more reliable than they otherwise would be. This can be crucially important in certain technical fields such as medical implementations, space-flight implementations, and numerous other contexts in which very high levels of reliability are demanded. Furthermore, due to implementation of embodiments of the present disclosure, end users will typically experience an increased level of mean time between failures (MBTF), a lower number of interruptions, a lower amount of system downtime, and so forth. Embodiments of the present disclosure also tend to have a high value proposition, as the investment is relatively inexpensive and the savings can be substantial.

FIG. 1 depicts an example architecture 100 of an example host 102, in accordance with at least one embodiment. This architecture is presented by way of example and not limitation, as other architectures could certainly be used in different contexts. As shown, the host 102 includes a CPU 104, a GPU 106, a memory 108, a data storage 110, and a set of one or more peripherals 112, all of which are communicatively connected with one another via a system bus 114. The architecture 100 of the host 102 is not discussed in great detail here. For purposes of this disclosure, among the more salient aspects of the architecture 100 of the host 102 is that the CPU 104 and the GPU 106 are able to communicate instructions and data with one another via the system bus 114.

An example architecture 300 of an example GPU 302 is shown in and described below in connection with FIG. 3. In accordance with embodiments of the present disclosure, the GPU 302 could be deployed in an architecture such as the example architecture 100 of the example host 102 of FIG. 1. Moreover, it is noted that any device, system, and/or the like that is depicted in any of the figures may take a form similar to the example computer system 700 that is described in connection with FIG. 7, and may have a software architecture similar to the example software architecture 802 that is described in connection with FIG. 8. Any communication link, connection, and/or the like could include one or more wireless-communication links (e.g., Wi-Fi, Bluetooth, LTE, 5G, etc.) and/or one or more wired-communication links (e.g., Ethernet, USB, and so forth).

Figure 2:
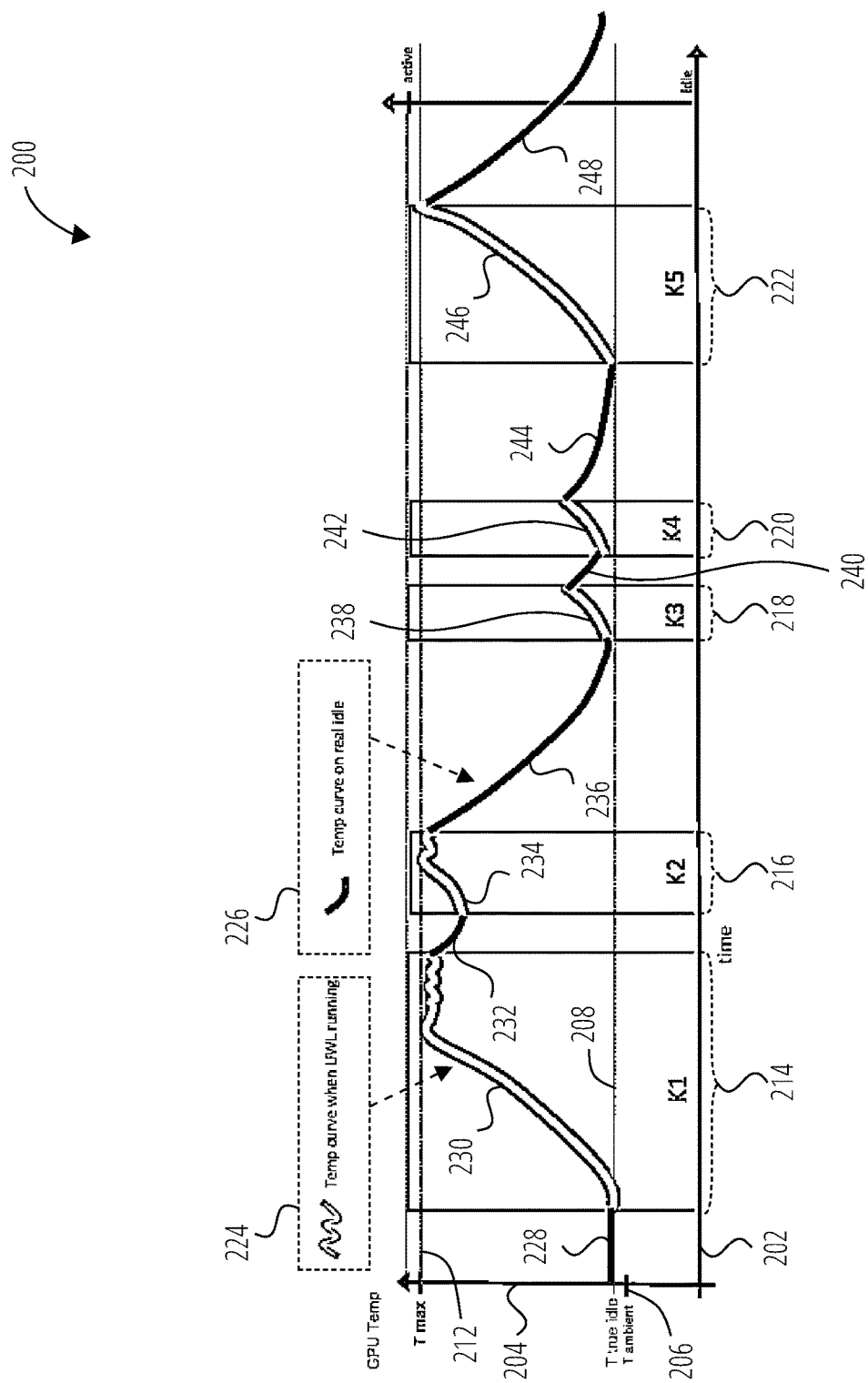
FIG. 2 depicts a first example processor-temperature graph, in accordance with at least one embodiment.
Figure 3:
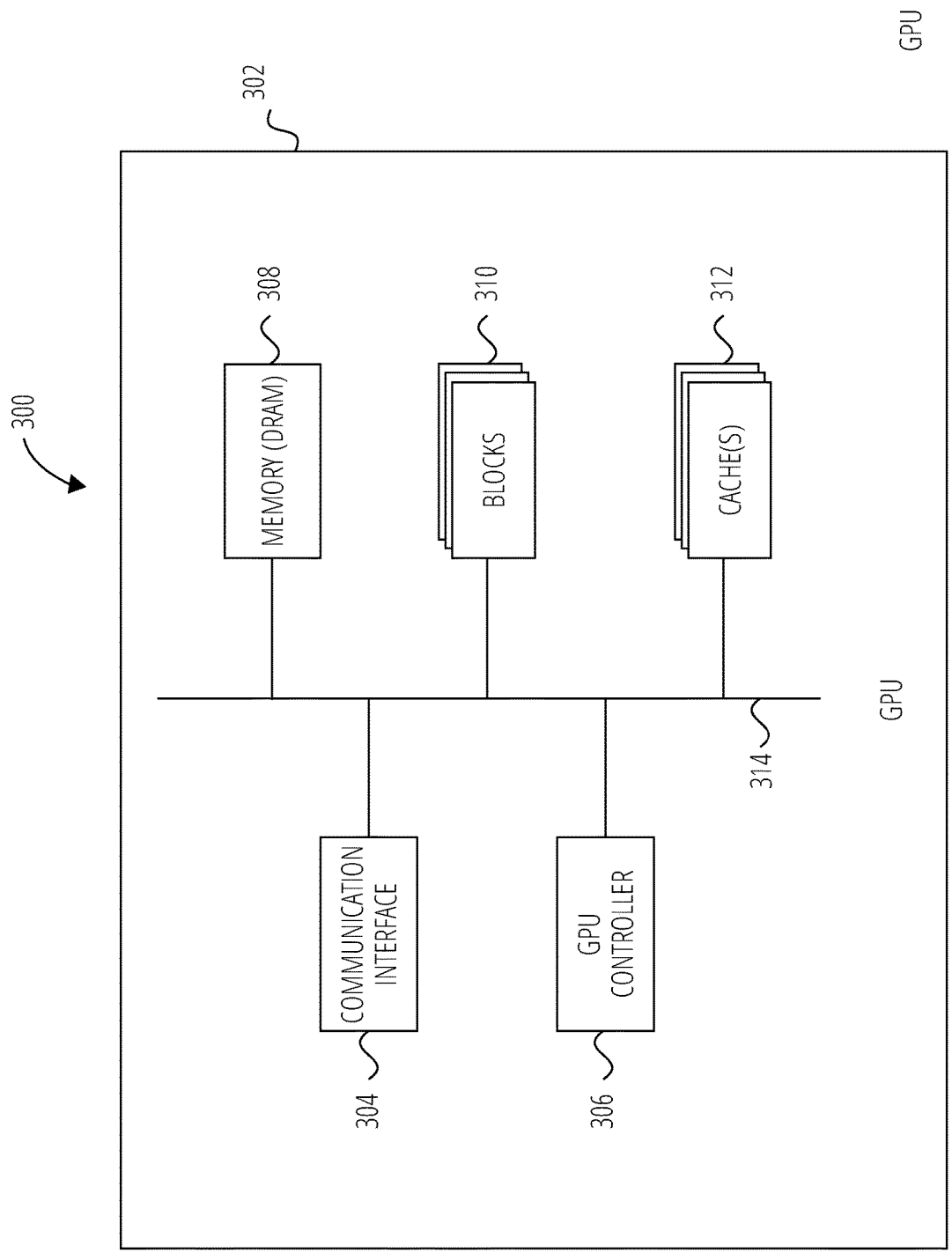
FIG. 3 depicts an example architecture of the example GPU of FIG. 1, in accordance with at least one embodiment.
Figure 5:
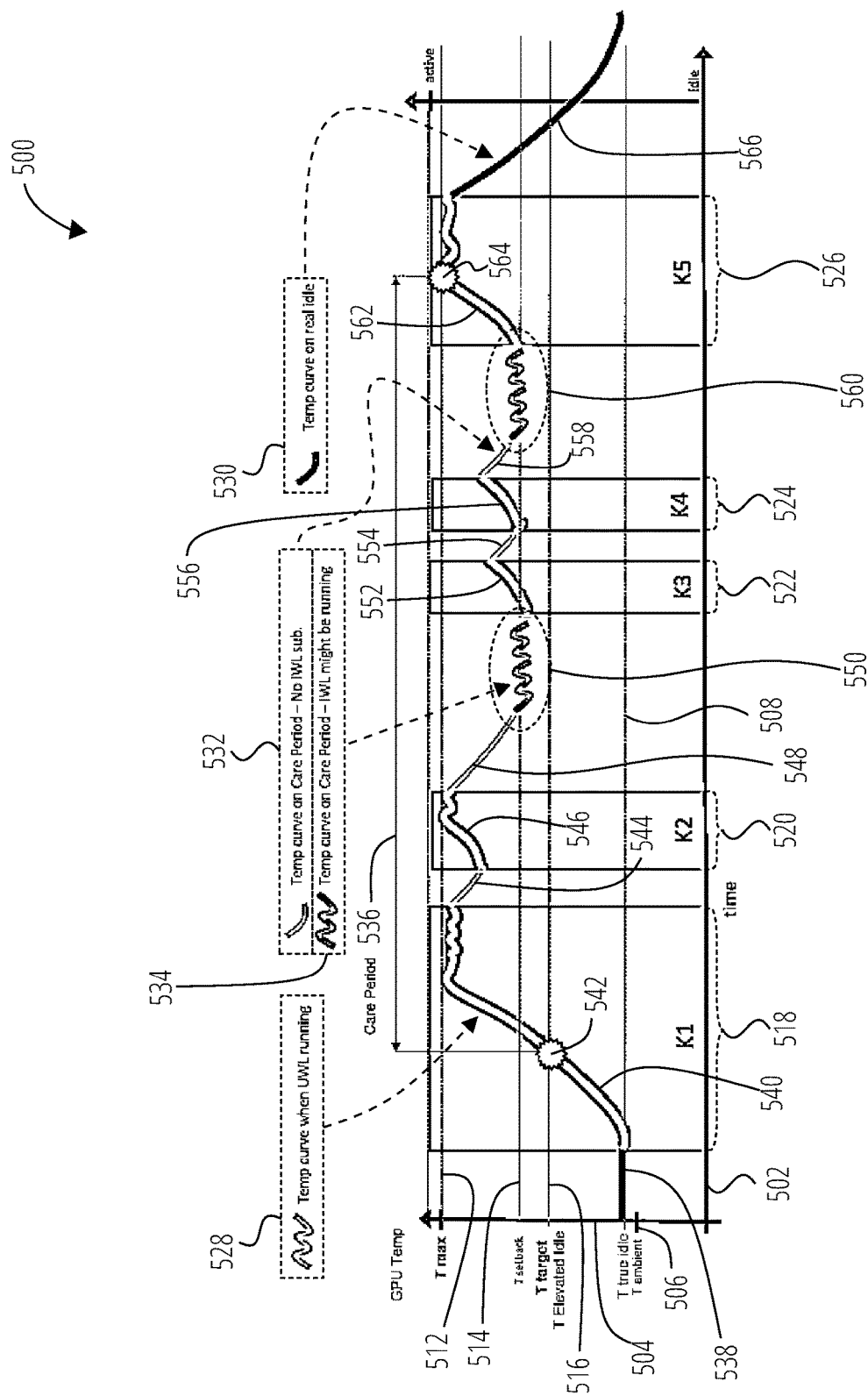
FIG. 5 depicts a second example processor-temperature graph, in accordance with at least one embodiment.

Prior to discussing the example architecture 300 of the GPU 302 of FIG. 3, an example processor-temperature graph is discussed here—in particular the processor-temperature graph 200 of FIG. 2, which depicts an example temperature-to-time behavior that could be exhibited by a conventional GPU—i.e., a GPU that does not implement the aspects of embodiments of the present disclosure that pertain to achieving a stable and elevated idle-mode on-chip temperature of a processor. It is noted that the processor-temperature graph 200 of FIG. 2 and a processor-temperature graph 500 of FIG. 5 are similar to one another in basic structure. As such, aspects that are common to the two graphs are not redundantly fully explained in connection with the processor-temperature graph 500 of FIG. 5. It is also noted that the processor-temperature graph 200 and the processor-temperature graph 500 depict example behaviors of corresponding GPUs. In at least one embodiment, the total time, the timing of the kernels that are executed, the content of those kernels, the timing of the gaps between executions of the various kernels, and so forth, are common across the two graphs in order to illustrate different temperature-related behaviors in each of the two graphs.

Turning now to FIG. 2, the processor-temperature graph 200 includes an x-axis 202 that shows time flowing from left to right, and also includes a y-axis 204 that shows on-chip temperature of the example conventional (and non-idle-mode-power-saving) GPU to which the processor-temperature graph 200 corresponds. Several temperatures, which are referred to below, are denoted on the y-axis 204: an ambient temperature 206 (Tambient), a true-idle temperature 208 (Ttrue idle), and an upper temperature threshold 212 (Tmax).

In the processor-temperature graph 200, it can be seen that five kernels are executed in the following temporal order: kernel K1 214, kernel K2 216, kernel K3 218, kernel K4 220, and kernel K5 222. Those five kernels make up the UWL in the processor-temperature graph 200. Each of these kernels may represent a respective block of code that the GPU has been instructed to execute by its corresponding CPU. Also shown in a legend above the graph is that active mode is represented on the processor-temperature graph 200 using what are referred to herein as "active segments" of an active-temperature curve 224. Similarly, idle mode is represented on the processor-temperature graph 200 with what are referred to herein as "idle segments" of an idle-temperature curve 226.

Sequentially from left to right, it can be seen that the following segments are present: an idle segment 228, an active segment 230 (during execution of the kernel K1 214), an idle segment 232, an active segment 234 (during execution of the kernel K2 216), an idle segment 236, an active segment 238 (during execution of the kernel K3 218), an idle segment 240, an active segment 242 (during execution of the kernel K4 220), an idle segment 244, an active segment 246 (during execution of the kernel K5 222), and an idle segment 248. It can be visually appreciated in FIG. 2 that the temperature of the associated GPU is fluctuating significantly as the GPU passes in and out of the various idle periods and active periods. As discussed above, it is this type of fluctuation that introduces thermal stresses at the various package interfaces, inducing the thermomechanical reliability problem addressed by embodiments of the present disclosure.

FIG. 3 depicts the above-mentioned example architecture 300 of the example GPU 302, which could be used in an architecture such as the architecture 100 of the host 102 of FIG. 1 (in addition to or instead of the GPU 106 depicted there). The architecture 300 of the GPU 302 is not described in exhaustive detail here, as embodiments of the present disclosure can be implemented on a vast variety of types of GPUs, and indeed can be implemented on many existing GPU architectures. Furthermore, those of skill in the art are quite familiar with the basics of GPU architectures.

As can be see in FIG. 3, the architecture 300 of the GPU 302 includes a communication interface 304, a GPU controller 306, a memory 308, a plurality of blocks 310, and one or more caches 312. The communication interface 304 could be any suitable communication interface for communicating, e.g., instructions and data across a system bus with a CPU on the same PCB. Such interfaces are well-known to those of skill in the art. The GPU controller 306 could be any suitable logic component configured to control various aspects of the operation, configuration, and so forth of the GPU 302. Those of skill in the art are familiar as a general matter with control circuits on GPUs.

The memory 308 could be any suitable type and amount of memory—e.g., random access memory (RAM) such as dynamic RAM (DRAM). There could be any number of blocks 310 in any given architecture of a given GPU. The blocks may be the hardware components that carry out all of the execution of instructions on the GPU 302. A typical implementation employs multiple threads per block to take advantage of parallelism and improve throughput. The one or more caches 312 may include one or more L1 caches, one or more L2 caches, one or more L3 caches, and/or the like. Furthermore, although visually depicted together in FIG. 3, it is the case in many implementations that, and in general it is typically an implementation of multiple threads per block that some caches are dedicated to particular blocks whereas other caches are shared by multiple blocks. Those of skill in the art are also familiar with GPU-cache arrangements.

In various different embodiments, the GPU 302 includes hardware controls (e.g., the GPU controller 306) that selectively enable and disable one or more idle-mode power-saving features of the GPU 302. In many (but not all) embodiments, including most of the embodiments that are described in the present disclosure, the one or more idle-mode power-saving features that are available on the GPU 302 are enabled as their default setting. The GPU controller 306 is also, in at least one embodiment, the component that collects the herein-described temperature readings and makes the herein-described temperature-related calculations, logical decision, and so forth. The GPU 302 in various embodiments also includes any number of other standard components (to measure temperature, as one example) that are not explicitly depicted in FIG. 3.

Figure 4:
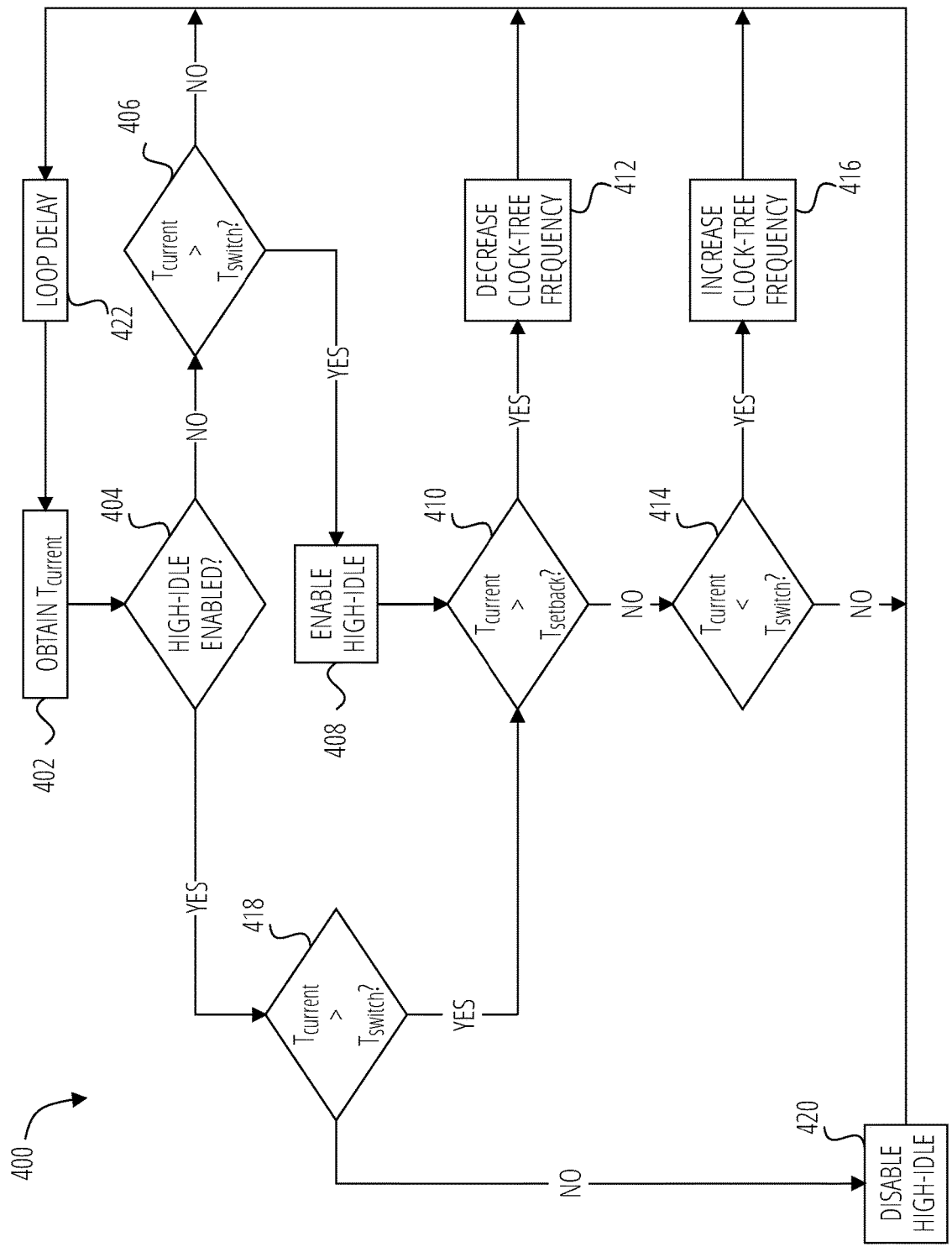
FIG. 4 depicts a first example method, in accordance with at least one embodiment.

FIG. 4 depicts a first example flowchart 400, in accordance with at least one embodiment. In at least one embodiment, the flowchart 400 is implemented by the GPU controller 306. In FIG. 4, the term "high-idle" is used as a feature that can be either enabled or disabled. As used herein, high-idle being enabled means that the systems and methods of embodiments of the present disclosure are being utilized. Another way of saying this is that high-idle being enabled means that one or more of the idle-mode power-saving features of the GPU 302 have been disabled. Conversely, high-idle being disabled means that the one or more power-saving features of the GPU 302 are all enabled. In other words, those power-saving features are being permitted to save power when "high-idle" is low.

It is noted that having high-idle enabled (and therefore having one, some, or all of the idle-mode power-saving features of the GPU 302 disabled) can result in significant amounts of power being dissipated by the GPU 302. In embodiments of the present disclosure, even more power can be dissipated on top of that by the GPU controller 306 manipulating one or more operating parameters of the GPU 302. As an example, most GPUs have a "clock tree," which is circuitry that distributes a clock signal to the blocks 310 and other components of the GPU 302. The frequency of that clock signal dictates the speed at which the various components (including the blocks 310) operate. That frequency is, in many embodiments of the present disclosure, adjustable. The higher the clock-tree frequency, the more power will be dissipated by the GPU 302, and the higher the on-chip temperature will be. Similarly, the clock-tree frequency can be dialed down to reduce power dissipation and on-chip temperature.

Moreover, it is noted that, although clock-tree frequency is the GPU operating parameter that is discussed most often in this disclosure as being a "dial" that the GPU controller 306 can turn to either increase or decrease power dissipation and temperature, other operating parameters could be "dialed" up and down in addition to or instead of the clock-tree frequency in various different embodiments. One such operating parameter is the level of input voltage used by the various blocks 310 of the GPU 302. Furthermore, as described below, in various different embodiments, the GPU 302 implements logic that enforces both a lower and a higher threshold when high-idle is enabled. The lower threshold is also referred to at times as the "target" threshold, and the higher threshold is referred to at times as the "setback" threshold. In some embodiments, the setback threshold could be increased or decreased to cause a consequent increase or decrease in power dissipation and on-chip temperature.

As but one example, disabling clock gating at all levels of a design hierarchy of the GPU 302, and also raising the clock-tree frequency of the GPU 302 to a suitable level, can cause the GPU 302 to dissipate an amount of power that would be a multiple of the power dissipated when the GPU 302 executes a typical UWL (with all of the idle-mode power-saving features enabled). As a general matter, selectively enabling and disabling one or more idle-mode power-saving features of a given GPU can be accomplished via firmware.

Turning now to the specific logic of the flowchart 400 of FIG. 4, the logic depicted there is described here as being performed by the GPU controller 306, though this is for convenience of presentation and is by way of example and not limitation. Additionally, it can be seen that the flowchart 400 is without a start block or an end block, and therefore this description of FIG. 4 starts arbitrarily but not by necessity at operation 402. In at least one embodiment of the present disclosure, the flowchart 400 is implemented in the firmware of the GPU controller 306.

At operation 402, the GPU controller 306 obtains a current on-chip temperature ($T_{current}$) of the GPU 302. The GPU controller 306 may perform operation 402 by periodically read junction temperature at several points on the GPU die, and then using those junction-temperature readings to calculate an estimate of the current on-chip temperature, which may represent a current temperature at various package locations such as solder balls. It is noted that, in some embodiments, the GPU 302 has thermal sensors on the periphery of the GPU package, where those thermal sensors are communicatively connected to control logic such as the GPU controller 306. In such embodiments, the GPU controller 306 obtains $T_{current}$ from such sensors. In other embodiments, as described, the GPU controller 306 obtains $T_{current}$ as a derivative of one or more other temperature readings. Other approaches for obtaining $T_{current}$ could be used as well.

Control then proceeds to decision box 404, where the GPU controller 306 determines whether or not high-idle is currently enabled. If not, control proceeds to decision box 406, where the GPU controller 306 determines whether or not $T_{current}$ is greater than a threshold temperature that is labeled "$T_{switch}$" in FIG. 4. $T_{switch}$ may correspond with what is referred to herein as a "target temperature." For example, $T_{switch}$ could correspond to the below-described target elevated-idle temperature 516 in the processor-temperature graph 500 of FIG. 5. The reason for the "$T_{switch}$" name here is that it is that threshold that, in at least one embodiment, the GPU controller 306 uses to determine whether to keep high-idle enabled, keep high-idle disabled, or switch the state of high-idle from enabled to disabled or vice versa.

If, at decision box 404, the GPU controller 306 determines that $T_{current}$ is not greater than $T_{switch}$, control proceeds to operation 422, which implements a loop delay that, in at least some embodiments, is a configurable parameter. The time duration of the loop-delay parameter determines how often the GPU controller 306 performs the rest of the logic of the flowchart 400. In various different embodiments, the loop delay may last on the order of hundreds of milliseconds or a few seconds, as examples, though any suitable loop delay could be used. Some embodiments do not include a loop delay, and instead run effectively continuously.

After the loop delay of operation 422, control returns to operation 402. It is noted that the control path just described corresponds to the GPU controller 306 keeping high-idle disabled when $T_{current}$ is not higher than the $T_{switch}$ threshold—in other words, the GPU controller 306 keeps high-idle disabled to let the temperature stay low if it is already low (i.e., lower than $T_{switch}$). (As described above, a primary goal of embodiments of the present disclosure is to keep temperature fluctuations from happening often.)

If the GPU controller 306 instead determines at decision box 406 that $T_{current}$ is greater than $T_{switch}$, then control proceeds to operation 408, where the GPU controller 306 enables high-idle. This corresponds to the GPU controller 306 turning high-idle on, so that high-idle can keep the temperature high when it is already high, again avoiding fluctuations. This portion of the logic may correspond, then, to a situation where the temperature had been low, and high-idle had accordingly been disabled, and then temperature climbed and climbed until $T_{current}$ exceeded $T_{switch}$, triggering operation 408.

Returning the discussion back to decision box 404 for a moment, if the GPU controller 306 instead determines there that high-idle is currently enabled, then control proceeds to decision box 418, where (similar to decision box 406) the GPU controller 306 determines whether $T_{current}$ exceeds $T_{switch}$. If not, control proceeds to operation 420, where the GPU controller 306 disables high-idle. Control then proceeds around to the loop delay implemented by the operation 422. This branch of the logic of the flowchart 400 corresponds to a time when the temperature had been being stably kept elevated by high-idle, and then at a certain point the temperature dropped below $T_{switch}$. Again, with the goal of avoiding unnecessary fluctuations, the GPU controller 306 disables high-idle to let the temperature decrease when it was already on its way down.

The disabling of high-idle at operation 420 may correspond to detecting a temperature drop of more than a pre-specified delta, which may occur when a temperature fluctuation (in this case a decrease) that high idle is aimed generally at preventing had somehow happened anyway. In that circumstance, the GPU controller 306 may be configured to consider it the better move at that point to let the temperature continue to drop rather than to intentionally keep it elevated using high-idle. Furthermore, the disabling of high-idle at operation 420 may be considered an "early disable" of high-idle embodiments that impose an upper limit on the amount of time that the GPU controller 306 can keep high-idle enabled. Thus, more explicitly stated, in some embodiments, another trigger (not shown in FIG. 4) for disabling high-idle is that an associated timer has expired. That timer may define the maximum duration of what is referred to herein at times as the "care period," a term for a time during which high-idle is enabled.

If the GPU controller 306 determines instead at decision box 418 that $T_{current}$ is greater than $T_{switch}$, then control proceeds to decision box 410. This branch of the logic corresponds to the GPU controller 306 keeping high-idle enabled when the temperature is still high, again avoiding an unnecessary fluctuation. Thus, it can be seen that there are two paths to get to decision box 410, and both involve $T_{current}$ exceeding $T_{switch}$. Thus, when decision box 410 is reached, the temperature is high and high-idle is enabled. As described next, in at least some embodiments, the GPU controller 306 reduces fluctuations in temperature even during high-idle as well, thus achieving a stable elevated idle-mode temperature.

At decision box 410, the GPU controller 306 compares $T_{current}$ to a threshold that is different (and higher) than $T_{switch}$. This threshold is referred to herein as a "setback temperature," and is labeled "$T_{setback}$" in FIG. 4. To again take a sneak peak at FIG. 5, the $T_{setback}$ in that example is represented as the setback temperature 514. If the GPU controller 306 determines at decision box 410 that $T_{current}$ exceeds $T_{setback}$, then control proceeds to operation 412, where the GPU controller 306 decreases the clock-tree frequency of the GPU 302 in order to reduce the power dissipation and accordingly the temperature. This decrease may be a decrement of a fixed amount. Control then proceeds back to the loop delay at operation 422.

If the GPU controller 306 determines instead at decision box 410 that $T_{current}$ does not exceed $T_{setback}$, then control proceeds to the decision box 414, where the GPU controller 306 determines whether $T_{current}$ has now dropped below $T_{switch}$. If so, then control proceeds to operation 416, where the GPU controller 306 increases the clock-tree frequency of the GPU 302 in order to increase the power dissipation and accordingly the temperature. This increase may be an increment of a fixed amount, which may be the same as or different than the decrement amount associated with operation 412. Control then proceeds back to the loop delay at operation 422.

It is also noted that the fact that the pair of decision box 410 and operation 412 precedes the pair of decision box 414 and operation 416 is not necessary. The order could be reversed and the logical behavior would be the same. It can be seen that the foursome of decision box 410, operation 412, decision box 414, and operation 416 work together to stabilize the on-chip temperature essentially above $T_{switch}$ and below $T_{setback}$ while the GPU 302 is idle and high-idle is enabled. Of course there will be the border cases when $T_{current}$ inches above $T_{setback}$ or below $T_{switch}$ before being turned around back towards the range of temperature values above $T_{switch}$ and below $T_{setback}$.

Thus, in some embodiments, the GPU controller 306 permits hardware activity and power dissipation on the GPU 302 die at idle intervals (when no user workload is executing on the GPU 302) and adjusts the level of power dissipation so as to maintain an approximate target temperature at package interfaces such as solder balls. In various embodiments, this involves disabling one or more GPU power-management capabilities (i.e., the herein-described idle-mode power-saving features) such as power gating and/or clock gating of idle domains. That disabling leads to extra power dissipation. The level of dissipated power can be detected by reading on-die thermal sensors and then adjusted to target levels by regulating the frequency of (ungated) clock trees, as one option in some example embodiments.

In some embodiments, the flowchart 400 is implemented as a firmware control loop that uses hardware capabilities that are already implemented on many existing GPUs. As such, many embodiments of the present disclosure obviate the need to submit IWL kernels to the GPU 302, as has been proposed in connection with prior approaches, although this can be done as well. Avoiding the submission of IWL kernels makes for a simpler, more elegant solution.

As mentioned above, FIG. 5 depicts a second example processor-temperature graph 500, in accordance with at least one embodiment. The processor-temperature graph 500 corresponds to a GPU, such as the GPU 302, that does implement embodiments of the present disclosure. Thus, the processor-temperature graph 500 could correspond to a GPU that implements the high-idle feature described above. In some embodiments, the GPU implements logic such as the logic shown in the flowchart 400.

The following parts of the processor-temperature graph 500 are quite similar to corresponding parts of the processor-temperature graph 200, and therefore are only listed here but not redundantly described: an x-axis 502, a y-axis 504, an ambient temperature 506, a true-idle temperature 508, an upper temperature threshold 512, a kernel K1 518, a kernel K2 520, a kernel K3 522, a kernel K4 524, a kernel K5 526, an active-temperature curve 528, an idle-temperature curve 530, an idle segment 538, an active segment 540, an active segment 546, an active segment 552, an active segment 556, an active segment 562, and an idle segment 566.

There are two additional temperatures marked on the y-axis 504: a setback temperature 514, and a target elevated-idle temperature 516. The setback temperature 514 corresponds to $T_{setback}$ in FIG. 4, and the target elevated-idle temperature 516 corresponds to $T_{switch}$. There are also two additional types of curves in FIG. 5: a falling high-idle-temperature curve 532 and a bounded high-idle-temperature curve 534. Those correspond to the below-explained "falling high-idle segments" and "bounded high-idle segments, respectively."

Also marked in FIG. 5 is a care period 536, which is an example of the above-described care period, and extends from a high-idle-enable event 542 to a high-idle-disable event 564, corresponding respectively to when high-idle is enabled and later disabled in this example. It can be seen that, after the kernels that are completed during the care period 536, the ensuing segments are a falling high-idle segment 544, a falling high-idle segment 548, a falling high-idle segment 554, and a falling high-idle segment 558, respectively. These segments are quite similar to the beginning of idle segments that occur when high-idle is not enabled. For example, these segments are fairly similar to the first part of the idle segment 566, as well as the various idle segments in FIG. 2.

In each of the two instances when the temperature drops below the setback temperature 514 during the care period 536, it can be seen that a respective bounded high-idle segment ensues: the first of those two is a bounded high-idle segment 550, and the second is a bounded high-idle segment 560. These are the segments during which the logic of the flowchart 400—in particular but not limited to the foursome of the decision box 410, the operation 412, the decision box 414, and the operation 416—collectively operate to bound the on-chip temperature essentially above the target elevated-idle temperature 516 and below the setback temperature 514.

Figure 6:
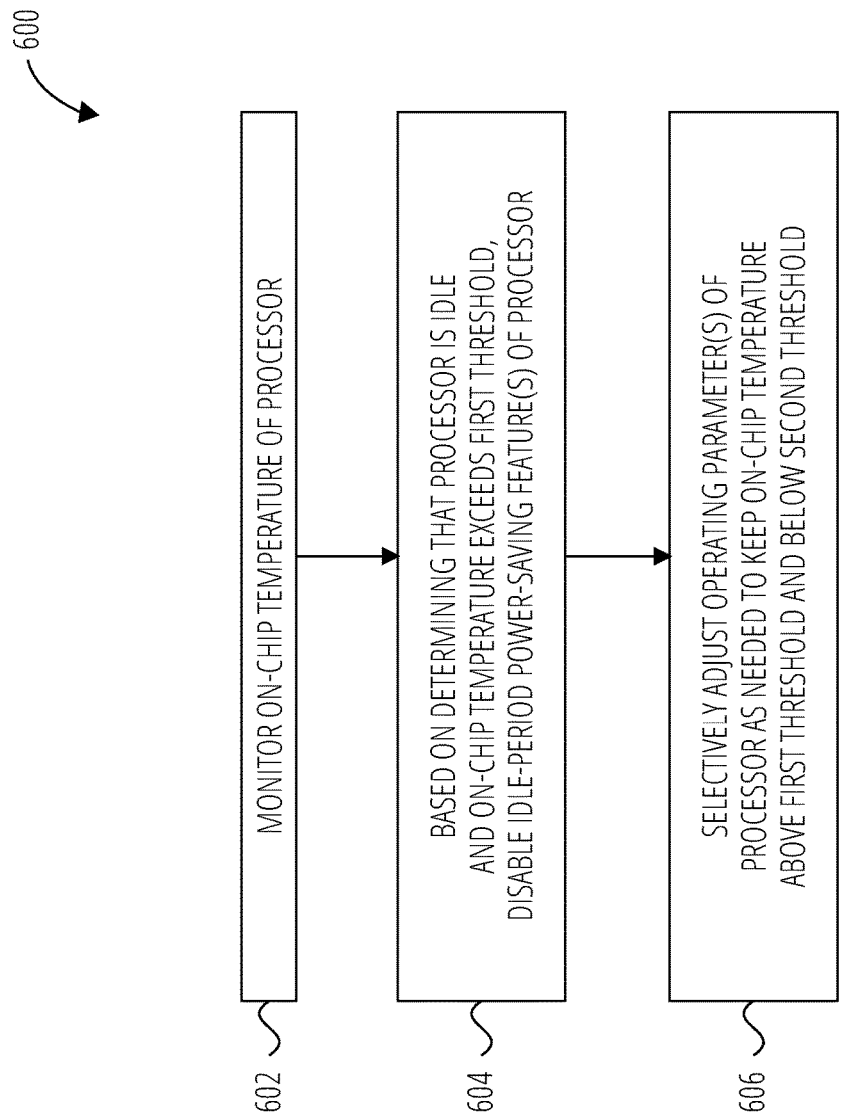
FIG. 6 depicts a second example method, in accordance with at least one embodiment.

FIG. 6 depicts a second example method 600, in accordance with at least one embodiment. As is the case above with respect to the flowchart 400 of FIG. 4, the method 600 is described here by way of example as being performed by the GPU controller 306.

At operation 602, the GPU controller 306 monitors the on-chip temperature of the GPU 302.

At operation 604, based on determining that the GPU 302 is idle and that the on-chip temperature of the GPU 302 exceeds a first (lower) threshold—i.e., $T_{switch}$ and the target elevated-idle temperature 516 in the above examples, the GPU controller 306 disables one or more idle-mode power-savings features of the GPU 302. The GPU controller 306 may perform operation 604 by enabling high-idle, as discussed above.

At operation 606, the GPU controller 306 selectively adjusts one or more operating parameters (e.g., clock-tree frequency) of the GPU 302 to keep the on-chip temperature of the GPU 302 between the aforementioned first (lower) threshold and a second (higher) threshold. The latter of those two thresholds corresponds to $T_{setback}$ and the setback temperature 514 in the case of the examples discussed above in connection with FIG. 4 and FIG. 5, respectively.

Mapping the operations of the method 600 of FIG. 6 onto elements of the flowchart 400 of FIG. 4:

operation 602 corresponds to operation 402 ("Obtain $T_{current}$");

operation 604 corresponds to decision box 406 ("Is $T_{current}$ greater than $T_{switch}$?") and operation 408 ("Enable High-Idle"); and operation 606 corresponds to the foursome of decision box 410 ("Is $T_{current}$ greater than $T_{setback}$?"), operation 412 ("Decrease Clock-Tree Frequency"), decision box 414 ("Is $T_{current}$ less than $T_{switch}$?"), and operation 416 ("Increase Clock-Tree Frequency").

Figure 7:
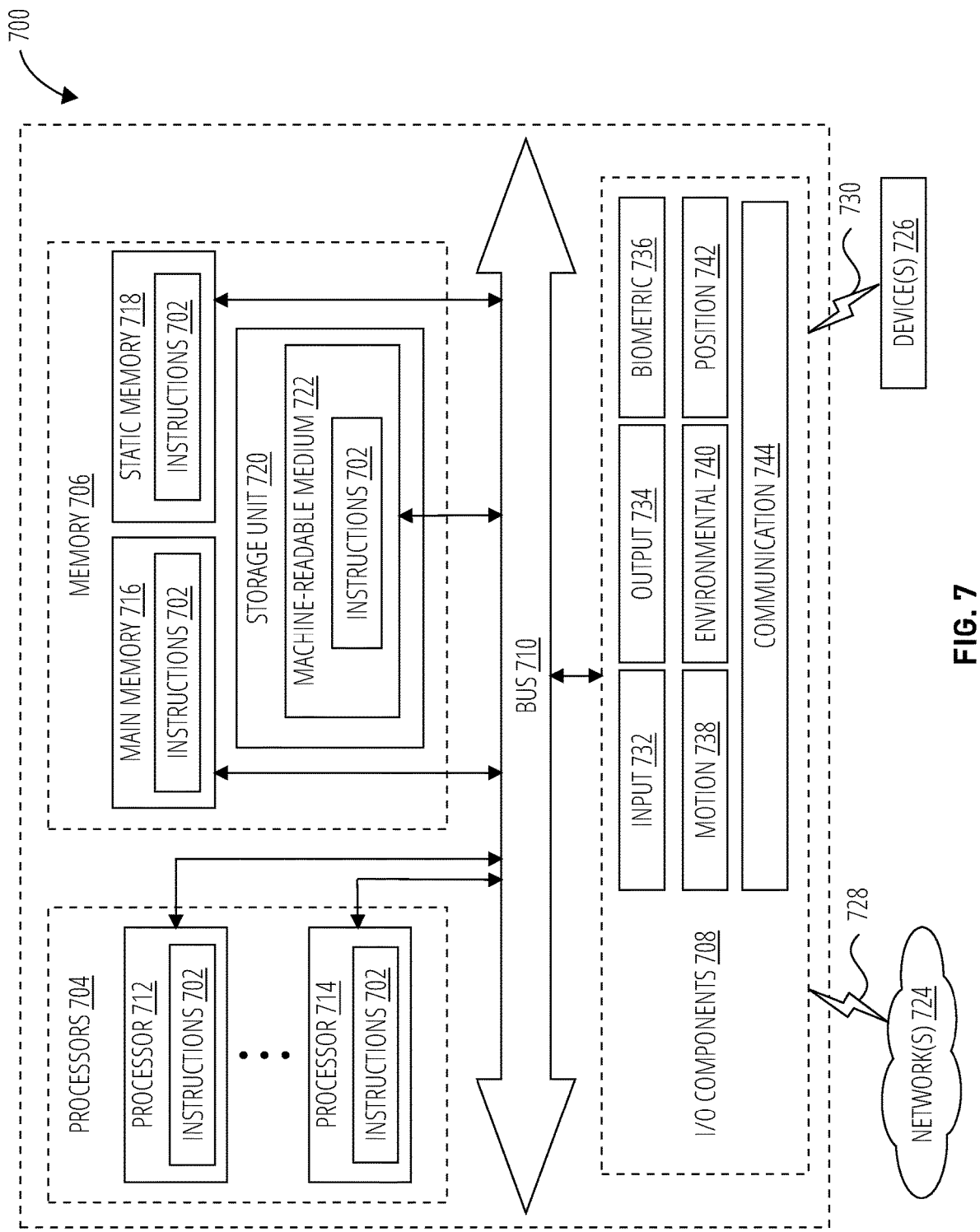
FIG. 7 depicts an example computer system, in accordance with at least one embodiment.

FIG. 7 depicts an example computer system 700 within which instructions 702 (e.g., software, firmware, a program, an application, an applet, an app, a script, a macro, and/or other executable code) for causing the computer system 700 to perform any one or more of the methodologies discussed herein may be executed. In at least one embodiment, execution of the instructions 702 causes the computer system 700 to perform one or more of the methods described herein. In at least one embodiment, the instructions 702 transform a general, non-programmed computer system into a particular computer system 700 programmed to carry out the described and illustrated functions. The computer system 700 may operate as a standalone device or may be coupled (e.g., networked) to and/or with one or more other devices, machines, systems, and/or the like. In a networked deployment, the computer system 700 may operate in the capacity of a server and/or a client in one or more server-client relationships, and/or as one or more peers in a peer-to-peer (or distributed) network environment.

The computer system 700 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 702, sequentially or otherwise, that specify actions to be taken by the computer system 700. And while only a single computer system 700 is illustrated, there could just as well be a collection of computer systems that individually or jointly execute the instructions 702 to perform any one or more of the methodologies discussed herein.

As depicted in FIG. 7, the computer system 700 may include processors 704, memory 706, and I/O components 708, which may be configured to communicate with each other via a bus 710. In an example embodiment, the processors 704 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 712 and a processor 714 that execute the instructions 702. The term "processor" is intended to include multi-core processors that may include two or more independent processors (sometimes referred to as "cores") that may execute instructions contemporaneously. Although FIG. 7 shows multiple processors 704, the computer system 700 may include a single processor with a single core, a single processor with multiple cores (e.g., a multi-core processor), multiple processors with a single core, multiple processors with multiples cores, or any combination thereof.

The memory 706, as depicted in FIG. 7, includes a main memory 716, a static memory 718, and a storage unit 720, each of which is accessible to the processors 704 via the bus 710. The memory 706, the static memory 718, and/or the storage unit 720 may store the instructions 702 executable for performing any one or more of the methodologies or functions described herein. The instructions 702 may also or instead reside completely or partially within the main memory 716, within the static memory 718, within machine-readable medium 722 within the storage unit 720, within at least one of the processors 704 (e.g., within a cache memory of a given one of the processors 704), and/or any suitable combination thereof, during execution thereof by the computer system 700. In at least one embodiment, the machine-readable medium 722 includes one or more non-transitory computer-readable storage media.

Furthermore, also as depicted in FIG. 7, I/O components 708 may include a wide variety of components to receive input, produce and/or provide output, transmit information, exchange information, capture measurements, and/or the like. The specific I/O components 708 that are included in a particular instance of the computer system 700 will depend on the type of machine. For example, portable machines such as mobile phones may include a touch input device or other such input mechanisms, while a headless server machine may not include such a touch input device. Moreover, the I/O components 708 may include many other components that are not shown in FIG. 7.

In various example embodiments, the I/O components 708 may include input components 732 and output components 734. The input components 732 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 734 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 708 may include, as examples, biometric components 736, motion components 738, environmental components 740, and/or position components 742, among a wide array of possible components. As examples, the biometric components 736 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 738 may include acceleration-sensing components (e.g., an accelerometer), gravitation-sensing components, rotation-sensing components (e.g., a gyroscope), and/or the like.

The environmental components 740 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 742 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 708 may further include communication components 744 operable to communicatively couple the computer system 700 to one or more networks 724 and/or one or more devices 726 via a coupling 728 and/or a coupling 730, respectively. For example, the communication components 744 may include a network-interface component or another suitable device to interface with a given network 724. In further examples, the communication components 744 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 726 may include one or more other machines and/or any of a wide variety of peripheral devices (e.g., a peripheral device coupled via a universal serial bus (USB) connection).

Moreover, the communication components 744 may detect identifiers or include components operable to detect identifiers. For example, the communication components 744 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 744, such as location via IP geolocation, location via Wi-Fi signal triangulation, location via detecting an NFC beacon signal that may indicate a particular location, and/or the like.

One or more of the various memories (e.g., the memory 706, the main memory 716, the static memory 718, and/or the (e.g., cache) memory of one or more of the processors 704) and/or the storage unit 720 may store one or more sets of instructions (e.g., software) and/or data structures embodying or used by any one or more of the methodologies or functions described herein. These instructions (e.g., the instructions 702), when executed by one or more of the processors 704, cause performance of various operations to implement various embodiments of the present disclosure.

The instructions 702 may be transmitted or received over one or more networks 724 using a transmission medium, via a network-interface device (e.g., a network-interface component included in the communication components 744), and using any one of a number of transfer protocols (e.g., the Session Initiation Protocol (SIP), the HyperText Transfer Protocol (HTTP), and/or the like). Similarly, the instructions 702 may be transmitted or received using a transmission medium via the coupling 730 (e.g., a peer-to-peer coupling) to one or more devices 726. In some embodiments, IoT devices can communicate using Message Queuing Telemetry Transport (MQTT) messaging, which can be relatively more compact and efficient.

Figure 8:
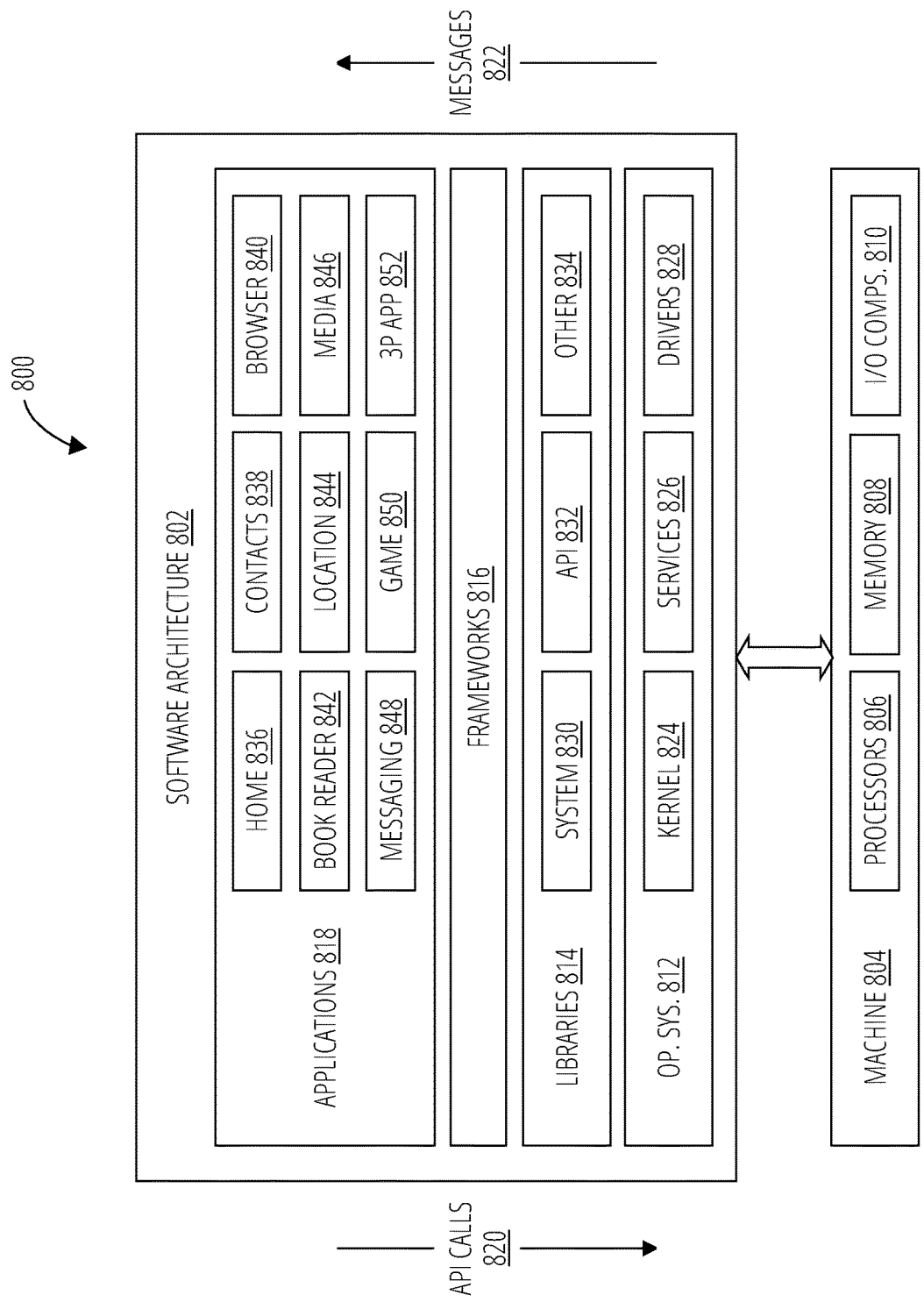
FIG. 8 depicts an example software architecture that could be executed on the example computer system of FIG. 7, in accordance with at least one embodiment.

FIG. 8 is a system diagram 800 illustrating an example software architecture 802, which can be installed on any one or more of the devices described herein. For example, the software architecture 802 could be installed on any device or system that is arranged similar to the computer system 700. The software architecture 802 may be supported by hardware such as a machine 804 that may include processors 806, memory 808, and I/O components 810. In this example, the software architecture 802 can be conceptualized as a stack of layers, where each layer provides a particular functionality. The software architecture 802 may include layers such an operating system 812, libraries 814, frameworks 816, and applications 818. Operationally, using one or more application programming interfaces (APIs), the applications 818 may invoke API calls 820 through the software stack and receive messages 822 in response to the API calls 820.

In at least one embodiment, the operating system 812 manages hardware resources and provides common services. The operating system 812 may include, as examples, a kernel 824, services 826, and drivers 828. The kernel 824 may act as an abstraction layer between the hardware and the other software layers. For example, the kernel 824 may provide memory management, processor management (e.g., scheduling), component management, networking, and/or security settings, in some cases among one or more other functionalities. The services 826 may provide other common services for the other software layers. The drivers 828 may be responsible for controlling or interfacing with underlying hardware. For instance, the drivers 828 may include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 814 may provide a low-level common infrastructure used by the applications 818. The libraries 814 may include system libraries 830 (e.g., a C standard library) that may provide functions such as memory-allocation functions, string-manipulation functions, mathematic functions, and/or the like. In addition, the libraries 814 may include API libraries 832 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 814 may also include a wide variety of other libraries 834 to provide many other APIs to the applications 818.

The frameworks 816 may provide a high-level common infrastructure that may be used by the applications 818. For example, the frameworks 816 may provide various graphical-user-interface (GUI) functions, high-level resource management, high-level location services, and/or the like. The frameworks 816 may provide a broad spectrum of other APIs that may be used by the applications 818, some of which may be specific to a particular operating system or platform.

Purely as representative examples, the applications 818 may include a home application 836, a contacts application 838, a browser application 840, a book-reader application 842, a location application 844, a media application 846, a messaging application 848, a game application 850, and/or a broad assortment of other applications generically represented in FIG. 8 as a third-party application 852. The applications 818 may be programs that execute functions defined in the programs. Various programming languages may be employed to create one or more of the applications 818, structured in a variety of manners, such as object-oriented programming languages (e.g., Objective-C, Java, C++, etc.), procedural programming languages (e.g., C, assembly language, etc.), and/or the like. In a specific example, the third-party application 852 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. Moreover, a third-party application 852 may be able to invoke the API calls 820 provided by the operating system 812 to facilitate functionality described herein.

In view of the disclosure above, a listing of various examples of embodiments is set forth below. It should be noted that one or more features of an example, taken in isolation or combination, should be considered to be within the disclosure of this application.

Example 1 is a processor including: a communication interface configured to receive, from a first hardware component, instructions assigned to the processor for execution; temperature-measurement circuitry configured to monitor an on-chip temperature of the processor; and control logic configured to: determine whether the processor is active or idle; determine whether the on-chip temperature of the processor exceeds a first threshold; based on determining that the processor is idle and that the on-chip temperature of the processor exceeds the first threshold, disable one or more idle-mode power-saving features of the processor; and selectively adjust one or more operating parameters of the processor to keep the on-chip temperature of the processor between the first threshold and a second threshold, the second threshold being greater than the first threshold.

Example 2 is the processor of Example 1, wherein the processor includes a graphics processing unit.

Example 3 is processor of Example 1 or Example 2, where the temperature-measurement circuitry is configured to monitor the on-chip temperature of the processor at least in part by: obtaining one or more temperature readings made at one or more junction points of a package interface of the processor; and calculating the on-chip temperature of the processor based on the one or more obtained temperature readings.

Example 4 is the processor of any of the Examples 1-3, where the temperature-measurement circuitry is configured to monitor the on-chip temperature of the processor at least in part by directly measuring the on-chip temperature of the processor.

Example 5 is the processor of any of the Examples 1-4, where the control logic being configured to disable the one or more idle-mode power-saving features of the processor includes the control logic being configured to disable one or more of dynamic power gating of idle blocks of the processor, dynamic clock gating of sequential elements on the processor, dynamic clock gating of idle logic units on the processor, and dynamic gating of clock trees on the processor.

Example 6 is the processor of any of the Examples 1-5, where selectively adjusting the one or more operating parameters of the processor includes selectively adjusting one or both of an operating frequency of a clock signal of the processor and an operating frequency of a clock tree of the processor.

Example 7 is the processor of any of the Examples 1-6, where selectively adjusting the one or more operating parameters of the processor includes selectively adjusting an input voltage to at least one hardware component of the processor.

Example 8 is at least one computer-readable storage medium containing instructions that, when executed by at least one hardware processor, cause the hardware processor to perform operations including: monitoring an on-chip temperature of the processor; based on determining that the processor is idle and that the on-chip temperature of the processor exceeds a first threshold, disabling one or more idle-mode power-saving features of the processor; and selectively adjusting one or more operating parameters of the processor to keep the on-chip temperature of the processor between the first threshold and a second threshold, the second threshold being greater than the first threshold.

Example 9 is the at least one computer-readable storage medium of Example 8, where the processor comprises a graphics processing unit.

Example 10 is the at least one computer-readable storage medium of Example 8 or Example 9, where monitoring the on-chip temperature of the processor includes: obtaining one or more temperature readings made at one or more junction points of a package interface of the processor; and calculating the on-chip temperature of the processor based on the one or more obtained temperature readings.

Example 11 is the at least one computer-readable storage medium of Example 8, where monitoring the on-chip temperature of the processor includes directly measuring the on-chip temperature of the processor.

Example 12 is the at least one computer-readable storage medium of any of the Examples 8-11, where disabling the one or more idle-mode power-saving features of the processor includes disabling one or more of dynamic power gating of idle blocks of the processor, dynamic clock gating of sequential elements on the processor, dynamic clock gating of idle logic units on the processor, and dynamic gating of clock trees on the processor.

Example 13 is the at least one computer-readable storage medium of any of the Examples 8-12, where selectively adjusting the one or more operating parameters of the processor includes selectively adjusting one or both of an operating frequency of a clock signal of the processor and an operating frequency of a clock tree of the processor.

Example 14 is the at least one computer-readable storage medium of any of the Examples 8-13, where selectively adjusting the one or more operating parameters of the processor includes selectively adjusting an input voltage to at least one hardware component of the processor.

Example 15 is a method performed by a processor, the method including: monitoring an on-chip temperature of the processor; based on determining that the processor is idle and that the on-chip temperature of the processor exceeds a first threshold, disabling one or more idle-mode power-saving features of the processor; and selectively adjusting one or more operating parameters of the processor to keep the on-chip temperature of the processor between the first threshold and a second threshold, the second threshold being greater than the first threshold.

Example 16 is the method of Example 15, where the processor includes a graphics processing unit.

Example 17 is the method of Example 15 or Example 16, where monitoring the on-chip temperature of the processor includes: obtaining one or more temperature readings made at one or more junction points of a package interface of the processor; and calculating the on-chip temperature of the processor based on the one or more obtained temperature readings.

Example 18 is the method of any of the Examples 15-17, where monitoring the on-chip temperature of the processor comprises directly measuring the on-chip temperature of the processor.

Example 19 is the method of any of the Examples 15-18, where disabling the one or more idle-mode power-saving features of the processor includes disabling one or more of dynamic power gating of idle blocks of the processor, dynamic clock gating of sequential elements on the processor, dynamic clock gating of idle logic units on the processor, and dynamic gating of clock trees on the processor.

Example 20 is the method of any of the Examples 15-19, where selectively adjusting the one or more operating parameters of the processor comprises selectively adjusting one or both of an operating frequency of a clock signal of the processor and an operating frequency of a clock tree of the processor.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Furthermore, in this disclosure, in one or more embodiments, examples, and/or the like, it may be the case that one or more components of one or more devices, systems, and/or the like are referred to as modules that carry out (e.g., perform, execute, and the like) various functions. With respect to any such usages in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

In at least one embodiment, the instructions for a given module are executable by the hardware for carrying out the one or more herein-described functions of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium. A module could be realized as a single component or be distributed across multiple components. In some cases, a module may be referred to as a unit.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A processor comprising:
a communication interface configured to receive, from a first hardware component, instructions assigned to the processor for execution;
temperature-measurement circuitry configured to monitor an on-chip temperature of the processor; and
control logic configured to:
determine whether the processor is active or idle;
determine whether the on-chip temperature of the processor exceeds a first threshold;
based on determining that the processor is idle and that the on-chip temperature of the processor exceeds the first threshold, disable one or more idle-mode power-saving features of the processor; and
selectively adjust one or more operating parameters of the processor to keep the on-chip temperature of the processor between the first threshold and a second threshold, the second threshold being greater than the first threshold.

2. The processor of claim 1, wherein the processor comprises a graphics processing unit.

3. The processor of claim 1, wherein the temperature-measurement circuitry is configured to monitor the on-chip temperature of the processor at least in part by:
obtaining one or more temperature readings made at one or more junction points of a package interface of the processor; and
calculating the on-chip temperature of the processor based on the one or more obtained temperature readings.

4. The processor of claim 1, wherein the temperature-measurement circuitry is configured to monitor the on-chip temperature of the processor at least in part by directly measuring the on-chip temperature of the processor.

5. The processor of claim 1, wherein the control logic being configured to disable the one or more idle-mode power-saving features of the processor comprises the control logic being configured to disable one or more of dynamic power gating of idle blocks of the processor, dynamic clock gating of sequential elements on the processor, dynamic clock gating of idle logic units on the processor, and dynamic gating of clock trees on the processor.

6. The processor of claim 1, wherein selectively adjusting the one or more operating parameters of the processor comprises selectively adjusting one or both of an operating frequency of a clock signal of the processor and an operating frequency of a clock tree of the processor.

7. The processor of claim 1, wherein selectively adjusting the one or more operating parameters of the processor comprises selectively adjusting an input voltage to at least one hardware component of the processor.

8. At least one non-transitory computer-readable storage medium containing instructions that, when executed by at least one hardware processor, cause the hardware processor to perform operations comprising:
monitoring an on-chip temperature of the processor;
based on determining that the processor is idle and that the on-chip temperature of the processor exceeds a first threshold, disabling one or more idle-mode power-saving features of the processor; and
selectively adjusting one or more operating parameters of the processor to keep the on-chip temperature of the processor between the first threshold and a second threshold, the second threshold being greater than the first threshold.

9. The at least one non-transitory computer-readable storage medium of claim 8, wherein the processor comprises a graphics processing unit.

10. The at least one non-transitory computer-readable storage medium of claim 8, wherein monitoring the on-chip temperature of the processor comprises:
   obtaining one or more temperature readings made at one or more junction points of a package interface of the processor; and
   calculating the on-chip temperature of the processor based on the one or more obtained temperature readings.

11. The at least one non-transitory computer-readable storage medium of claim 8, wherein monitoring the on-chip temperature of the processor comprises directly measuring the on-chip temperature of the processor.

12. The at least one non-transitory computer-readable storage medium of claim 8, wherein disabling the one or more idle-mode power-saving features of the processor comprises disabling one or more of dynamic power gating of idle blocks of the processor, dynamic clock gating of sequential elements on the processor, dynamic clock gating of idle logic units on the processor, and dynamic gating of clock trees on the processor.

13. The at least one non-transitory computer-readable storage medium of claim 8, wherein selectively adjusting the one or more operating parameters of the processor comprises selectively adjusting one or both of an operating frequency of a clock signal of the processor and an operating frequency of a clock tree of the processor.

14. The at least one non-transitory computer-readable storage medium of claim 8, wherein selectively adjusting the one or more operating parameters of the processor comprises selectively adjusting an input voltage to at least one hardware component of the processor.

15. A method performed by a processor, the method comprising:
   monitoring an on-chip temperature of the processor;
   based on determining that the processor is idle and that the on-chip temperature of the processor exceeds a first threshold, disabling one or more idle-mode power-saving features of the processor; and
   selectively adjusting one or more operating parameters of the processor to keep the on-chip temperature of the processor between the first threshold and a second threshold, the second threshold being greater than the first threshold.

16. The method of claim 15, wherein the processor comprises a graphics processing unit.

17. The method of claim 15, wherein monitoring the on-chip temperature of the processor comprises:
   obtaining one or more temperature readings made at one or more junction points of a package interface of the processor; and
   calculating the on-chip temperature of the processor based on the one or more obtained temperature readings.

18. The method of claim 15, wherein monitoring the on-chip temperature of the processor comprises directly measuring the on-chip temperature of the processor.

19. The method of claim 15, wherein disabling the one or more idle-mode power-saving features of the processor comprises disabling one or more of dynamic power gating of idle blocks of the processor, dynamic clock gating of sequential elements on the processor, dynamic clock gating of idle logic units on the processor, and dynamic gating of clock trees on the processor.

20. The method of claim 15, wherein selectively adjusting the one or more operating parameters of the processor comprises selectively adjusting one or both of an operating frequency of a clock signal of the processor and an operating frequency of a clock tree of the processor.

* * * * *